US012763965B2

(12) United States Patent
Colucci et al.

(10) Patent No.: US 12,763,965 B2
(45) **Date of Patent: *Oct. 13, 2026**

(54) METHOD AND SYSTEM FOR DATA EXCHANGE ON A NETWORK TO ENHANCE SECURITY MEASURES OF THE NETWORK, VEHICLE COMPRISING SUCH SYSTEM

(71) Applicant: FPT INDUSTRIAL S.P.A., Turin (IT)

(72) Inventors: Francesco Alessandro Colucci, Turin (IT); Alessandro Mazzurco, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 137 days.

This patent is subject to a terminal disclaimer.

(21) Appl. No.: 18/937,575

(22) Filed: Nov. 5, 2024

(65) Prior Publication Data

US 2025/0062907 A1 Feb. 20, 2025

Related U.S. Application Data

(63) Continuation of application No. 17/783,936, filed as application No. PCT/IB2020/061763 on Dec. 10, 2020, now Pat. No. 12,192,374.

(30) Foreign Application Priority Data

Dec. 10, 2019 (IT) ........................ 102019000023544

(51) Int. Cl.

| | |
|---|---|
| ***H04L 9/32*** | (2006.01) |
| ***G06F 21/64*** | (2013.01) |
| ***H04L 12/40*** | (2006.01) |

(52) U.S. Cl.

CPC .......... *H04L 9/3242* (2013.01); *H04L 9/3273* (2013.01)

(58) Field of Classification Search

CPC ............... H04L 9/3242; H04L 9/33273; H04L 2/40189; H04L 2/40013; H04L 67/22

See application file for complete search history.

(56) References Cited

U.S. PATENT DOCUMENTS

2015/0089236 A1* 3/2015 Han ...................... H04L 9/3271 713/168
2017/0109521 A1* 4/2017 Ujiie .................. B60R 16/0231

(Continued)

FOREIGN PATENT DOCUMENTS

EP 3462670 A1 4/2019

OTHER PUBLICATIONS

Efficient In-Vehicle Delayed Data Authentication Based on Compound Message Authentication Codes, by Nilsson et al., published 2008. (Year: 2008).*

(Continued)

*Primary Examiner* — Vu V Tran
(74) *Attorney, Agent, or Firm* — Leason Ellis LLP

(57) ABSTRACT

A method for data exchange on a communication network that includes a transmission bus, a first node and a second node. The first node carries out the steps of: constructing a first and a second data frame which transport first and second information data; calculating a first message authentication code as a function of the first and the second information data; constructing a third data frame which transports the first message authentication code; transmitting all of the data frames thus constructed. The second node carries out the steps of: receiving the first, the second and the third data frames; extracting the first and the second information data and the first message authentication code; calculating a second message authentication code as a function of the first and the second information data extracted; comparing the message authentication code extracted with the message (Continued)

authentication code calculated in order to verify the identity thereof.

26 Claims, 8 Drawing Sheets

(56) References Cited

U.S. PATENT DOCUMENTS

2017/0195878 A1* 7/2017 Takemori ............ H04L 63/0428
2018/0131522 A1* 5/2018 Lawlis .................. H04L 9/0631

OTHER PUBLICATIONS

Hiroshi Ueda et al., "Security Authentication System for In-Vehicle Network", SEI Technical Review, No. 81, Oct. 2015.
Chung-Wei Lin et al., "Cyber-Security for the Controller Area Network (CAN) Communication Protocol", ASE Conference on Automated Software Engineering, Dec. 2012.
Pal-Stefan Murvay et al., "Security Shortcomings and Countermeasures for the SAE J1939 Commercial Vehicle Bus Protocol", IEEE Transactions on Vehicular Technology, vol. 67, Issue 5, May 2018.
International Search Report and Written Opinion in PCT Application No. PCT/IB2020/061763, mailed Mar. 28, 2021.
Notice of Allowance in U.S. Appl. No. 17/783,936, mailed Sep. 20, 2024 (10 pages).
Non Final Office Action in U.S. Appl. No. 17/783,936, mailed May 15, 2024 (20 pages).

* cited by examiner

METHOD AND SYSTEM FOR DATA EXCHANGE ON A NETWORK TO ENHANCE SECURITY MEASURES OF THE NETWORK, VEHICLE COMPRISING SUCH SYSTEM

CROSS-REFERENCE TO RELATED APPLICATIONS

This patent application is a continuation of U.S. patent application Ser. No. 17/783,936, filed Jun. 9, 2022, which is a U.S. National Phase Application under 35 U.S.C. § 371 of International Patent Application No. PCT/IB2020/061763, filed on Dec. 10, 2020, which claims priority from Italian patent application no. 102019000023544 filed on Dec. 10, 2019, all of which are incorporated by reference, as if expressly set forth in their respective entireties herein.

TECHNICAL FIELD

The present invention relates to a method and to a system for data exchange on a communication network, and to a vehicle which comprises such system, in particular to enhance security measures of the data transmitted on the network.

STATE OF THE ART

Modern electronic systems for motor vehicles provide for the use of software operating on electronic control units (ECUs) which communicate with one another in a network, via serial buses and gateways. The majority of the current systems were not designed thinking about the security of the on-board data against internal or external attacks, for example generated with the intent of altering the exchanged data and causing a malfunction, an alteration or a crashing of the motor control applications and/or vehicle applications.

Processes, methods and instruments used for the design of the current automotive electronic systems concentrate on reliability and cost optimization. Methods and instruments for testing the reliability of automotive electronic systems vis-à-vis random faults are commercially available.

However, the aspects relating to security are rarely taken into account during the development of the hardware and of the software architecture; at the same time, the standard communication protocols do not provide shared methodologies for preventing or mitigating attacks.

The on-board vehicle communication networks are consequently vulnerable, as they allow the non-authorized access in a relatively simple manner, since all communications between the ECUs in the vehicle are carried out in the absence of authentication mechanisms sufficient to guarantee that the identities of the sender and of the receiver are not compromised.

Unfortunately, the current communication network protocols such as, for example, CAN (Controller Area Network), FlexRay, MOST and LIN to name a few, do not require authentication or at best have error control mechanisms (CRC) in order to guarantee the integrity of the data and send their messages in plain text.

Therefore, there is the possibility of fraudulent communications between control units.

With particular reference to the CAN protocol, in order to overcome the aforementioned drawbacks, various solutions have been proposed aimed at improving the security, in particular in terms of authenticity of the message and freshness of the information.

For example, Hiroshi UEDA et al., "Security Authentication System for In-Vehicle Network", SEI TECHNICAL REVIEW, No. 81, October 2015, proposes a review of the structure, or format, of the CAN messages in order to include a field relating to a control code. However, such solution would render necessary a general adaptation of the implemented protocol, which must be able to interpret the new message structure.

Other technical solutions provide for the introduction of a new message having a control function, adapted to transport control information calculated in relation to the application data included in specific messages to be protected. In this regard, see Chung-Wei Lin et al., "Cyber-Security for the Controller Area Network (CAN) Communication Protocol", ASE Conference on Automated Software Engineering, 2012. See also Pal-Stefan Murvay et al., "Security Shortcomings and Countermeasures for the SAE J1939 Commercial Vehicle Bus Protocol", IEEE Transactions on Vehicular Technology, Volume 67, Issue 5, May 2018. However, these solutions are not optimal, as the traffic on the network and the computational load are considerably increased.

Further solutions provide for the use of a CAN protocol introduced more recently, called CAN-FD, with increased data rate (>1 Mbit/s) and increased payload (>8 Bytes), optimizing the data transport and thus increasing the possibility of implementing solutions aimed at improving security. However, this solution has the drawback of requiring a readaptation of the on-board vehicle data exchange systems, which must be converted to the new protocol, with consequent costs.

The object of the present invention is to provide a solution to the drawbacks described above, which allows increasing the security of the information transferred between ECUs belonging to a same vehicle network, in an efficient and cost-effective manner, and without increasing the computational load and/or requiring modifications of the hardware resources.

SUMMARY OF THE INVENTION

According to the present invention, a method and a system for data exchange on a communication network, and a vehicle comprising such system are thus provided, as defined in the appended claims.

BRIEF DESCRIPTION OF THE DRAWINGS

For a better understanding of the present invention, a preferred embodiment will now be described, by way of non-limiting example, with reference to the accompanying drawings, wherein.

BEST MODE FOR CARRYING OUT THE INVENTION

Figure 1:
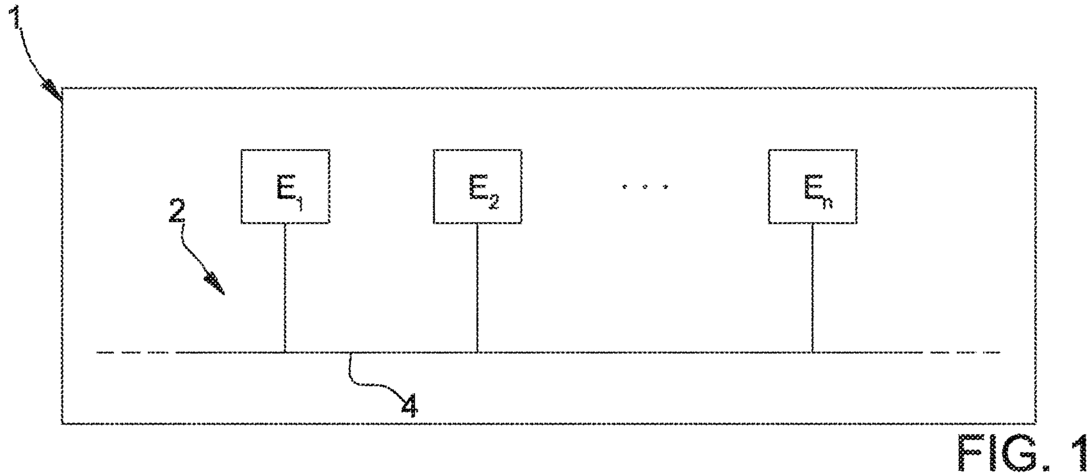
FIG. 1 schematically illustrates a data transmission/reception network between nodes belonging to such network, implemented in a vehicle.

FIG. 1 schematically shows a communication network 2, operating according to a transmission/reception protocol. The network 2 includes a bus 4 to which a plurality of nodes $E_1, E_2, \ldots, E_N$ are connected (where $E_N$ represents the $N^{th}$ node, with N chosen according to need as a function of the specific application).

In one embodiment of the present invention, the transmission protocol is of the CAN ("Controller Area Network") type. In this case, the bus 4 is a CAN bus. In the context of the present invention, explicit reference is made to a CAN protocol according to the version 2.0 (in particular 2.0A or 2.0B) adapted to be used in the automotive sector and installed on board a vehicle 1 (schematically illustrated in FIG. 1). However, what described is not limited to the automotive sector, and is generally applicable in all the sectors in which the use of a CAN protocol is provided. As will become more evident in the following, the present invention can also be implemented in types of networks, and related protocols, different from the CAN protocol.

Each node $E_1$-$E_N$, in the context of FIG. 1, is an electronic control unit, or ECU, belonging to the vehicle 1.

The CAN bus 4 can transmit different types of messages (or "frames"), among which: data frame, i.e. the frame containing the data that the node transmits; remote frame, i.e. the frame which requires the transmission of a specific identifier; error frame, i.e. the frame transmitted by any node that has detected an error; overload frame, i.e. the frame that introduces a delay between data frame and/or remote frame.

In the context of the present disclosure, the remote, error and overload frames are not relevant and thus will not be discussed in the following.

Figure 2:
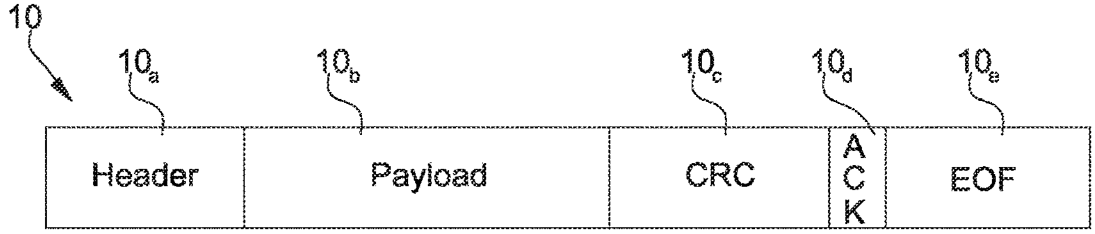
FIG. 2 illustrates a data frame exchanged between the nodes of the network of FIG. 1.

FIG. 2 illustrates a data frame 10, which contains data to be transferred between a sending node $E_1$-$E_N$ and one or more receiving nodes $E_1$-$E_N$. In the following, the data frame 10 will also be referred to by the term "message". Different messages are, typically, but not necessarily, characterized by an information content (i.e., the transported data) of different type from one another.

The data frame 10 includes, by way of example, five fields **10*a*-10*e***, specifically:

- a header field **10*a* including, in turn, one or more subfields used for defining the start of the data frame 10** and managing potential collisions, in a manner per se known;
- a data or payload field **10*b*, which contains the bytes (from 0 to 8 bytes) which must be transferred to the receiving node and represents the information load of the data frame 10** containing the useful data transmitted by a node;
- a cyclic redundancy check (CRC) field **10*c***, which contains a check sequence in order to check for errors contained in the message;
- an acknowledgement (ACK) field **10*d***, which acts as the field for the confirmation of reception by the receiving node;
- an end field (EOF) **10*c***.

The example illustrated in FIG. 2 is illustrative of a possible data frame, and different versions of the CAN protocol can define data frames having different types of fields. This is, however, irrelevant for the present invention, which is applicable to any type of data frame 10 defined according to the CAN protocol in any one of its versions.

Figure 3:
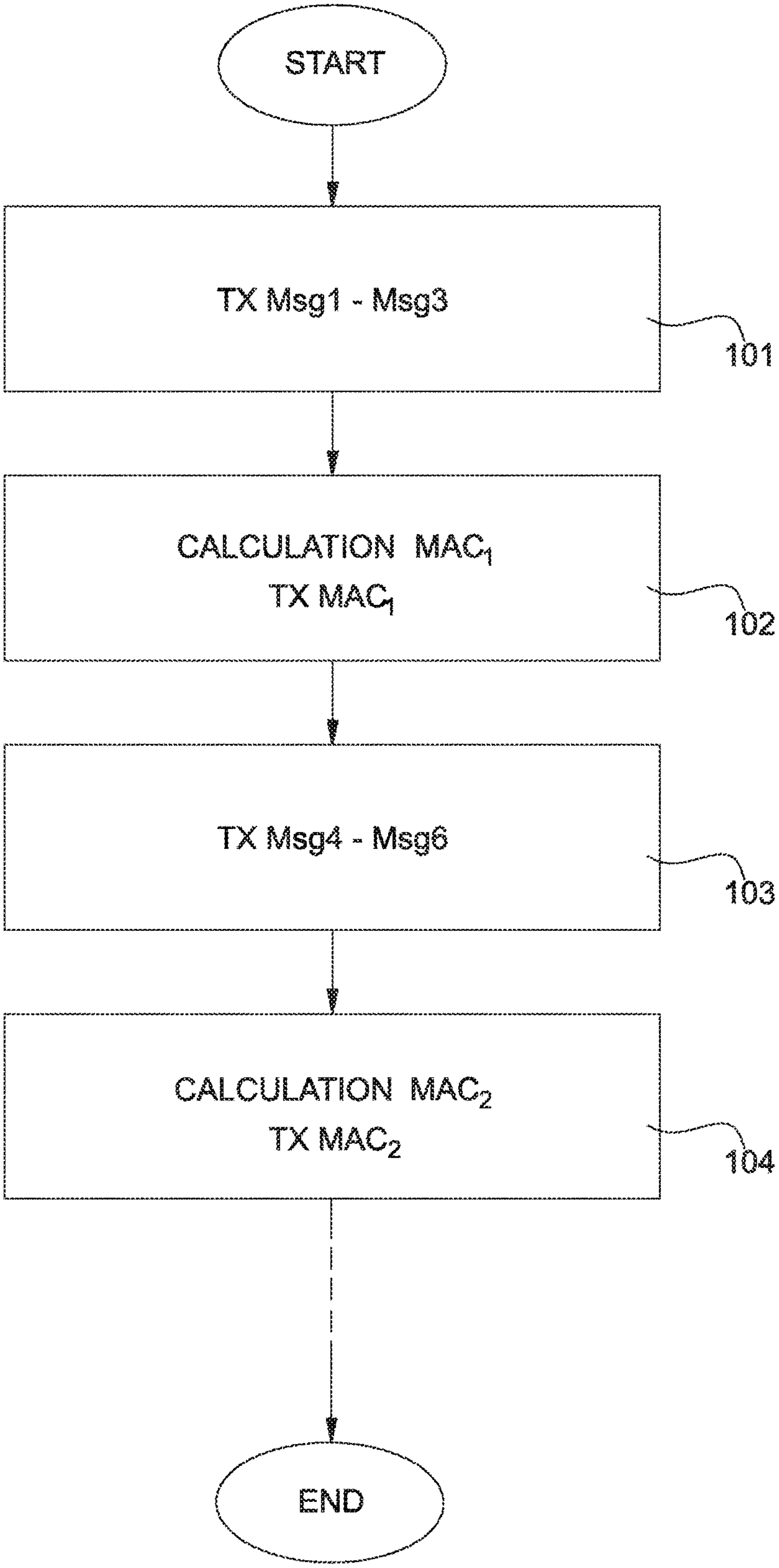
FIG. 3 illustrates, by means of a flowchart, a method implemented by the nodes of the network of FIG. 1 in transmission.

FIG. 3 illustrates, by means of a flowchart, a procedure for data transmission on the network 2 by a sending node, according to an aspect of the present invention. The transmission by the sending node can have a specific node as its receiver, or it can occur in broadcast mode.

In the following, by way of non-limiting example, one of the nodes of the network 2 (for example, the node $E_1$) transmits a plurality of messages Msg1-Msg6 to the CAN bus 4, towards a specific receiving node (for example, the node $E_N$). The following description is also applicable, by analogy and in a manner per se evident to a person skilled in the art, to a transmission broadcast.

Typically, the transmission of the data from the node $E_1$ to the node $E_N$ does not end with the transmission of a single message, and a plurality of messages Msg1-Msg6 are linked together, i.e. transmitted in sequence, from the node $E_1$ to the node Ex. The messages Msg1-Msg6 have, by way of example, the form illustrated in FIG. 2 and transport respective information data Data1-Data6 in their own payload field **10*b***.

The messages Msg1-Msg6 are placed in a queue (transmission buffer) at the sending node $E_1$, in order to be transmitted in the suitable sequence.

Therefore, with reference to step 101 of FIG. 3, the sending node $E_1$ transmits a subset of the messages Msg1-Msg6, here the subgroup formed by the messages Msg1, Msg2 and Msg3. In this step 101, the sending node $E_1$ can transmit any number of messages equal to, or greater than, two messages. It is evident that, in the case where the communication between the nodes $E_1$ and $E_N$ is completed with a single message, only such single message would be transmitted.

Then, step 102, the sending node $E_1$ transmits to the receiving node $E_N$ a control message called "Message Authentication Code" (MAC). In this step 102, the transmitted MAC (identified as $MAC_1$) is calculated as a function of the data Data1-Data3 contained in the payload field **10*b*** of each of the messages Msg1-Msg3 transmitted at step 101.

According to a further embodiment, the transmitted MAC code can be calculated on the basis of the content, in terms of bits, of the entire message, or of a predefined subset of fields or sub-fields of the message. In the following, to keep the description simple and with no loss of generality, the case where only the payload contributes to calculating the MAC code will be considered.

Figure 4:
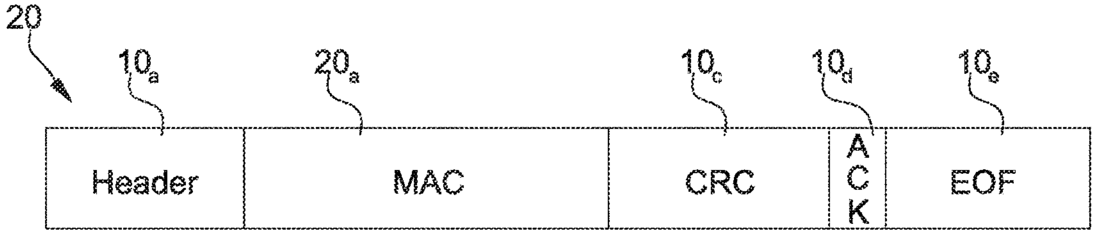
FIG. 4 illustrates an authentication frame exchanged between the nodes of the network of FIG. 1.

The frame that transports the MAC code (called "authentication frame" in the following) is analogous to a data frame, for example to the data frame 10 of FIG. 2, from the point of view of the structure, or format, of the fields composing it and of the number of transported bytes. See, for example, FIG. 4 in which an authentication frame 20 is illustrated (for example, the frame that transports the $MAC_1$ calculated in step 102). In at least one embodiment of the present invention, the authentication frame 20 is completely indistinguishable from a data frame defined by the CAN protocol.

Specifically, in this example, the authentication frame 20 comprises the header field **10*a*, the cyclical redundancy check field 10*c*, the acknowledgement field 10*d* and the end field 10*c* described above with reference to FIG. 2 and thus identified by the same reference numerals; the authentication frame 20 further comprises a field 20***a* entirely analogous to the payload field 10*b*; however, unlike the data frame 10, the authentication frame 20 contains, inside the field 20*a*, the bytes (here, 8 bytes) identifying the MAC code ($MAC_1$) calculated in step 102. It is noted that, from the point of view of the CAN protocol, the authentication frame 20 is indistinguishable from the data frame 10, from the point of view of the format.

Reverting to FIG. 3, step 102 is followed by step 103, in which the sending node $E_1$ sends to the CAN bus 4 three further messages Msg4, Msg5, Msg6, in an analogous manner to what carried out during step 1.

Then, step 104, the sending node $E_1$ transmits to the receiving node $E_N$ a new authentication message 20, including, in the field 20*a*, a MAC code ($MAC_2$ different from $MAC_1$) calculated as a function of the data Data4-Data6 contained in the payload field 10*b* of each of the messages Msg4-Msg6 transmitted at step 103.

It is noted that steps 103-104 are a replication of steps 101-102, carried out on respective messages. The procedure illustrated in FIG. 3 can continue indefinitely, until the sending node $E_1$ completes the queue of messages to be sent (thus carrying out steps analogous to steps 101-102, for all of the messages to be sent).

Figure 5:
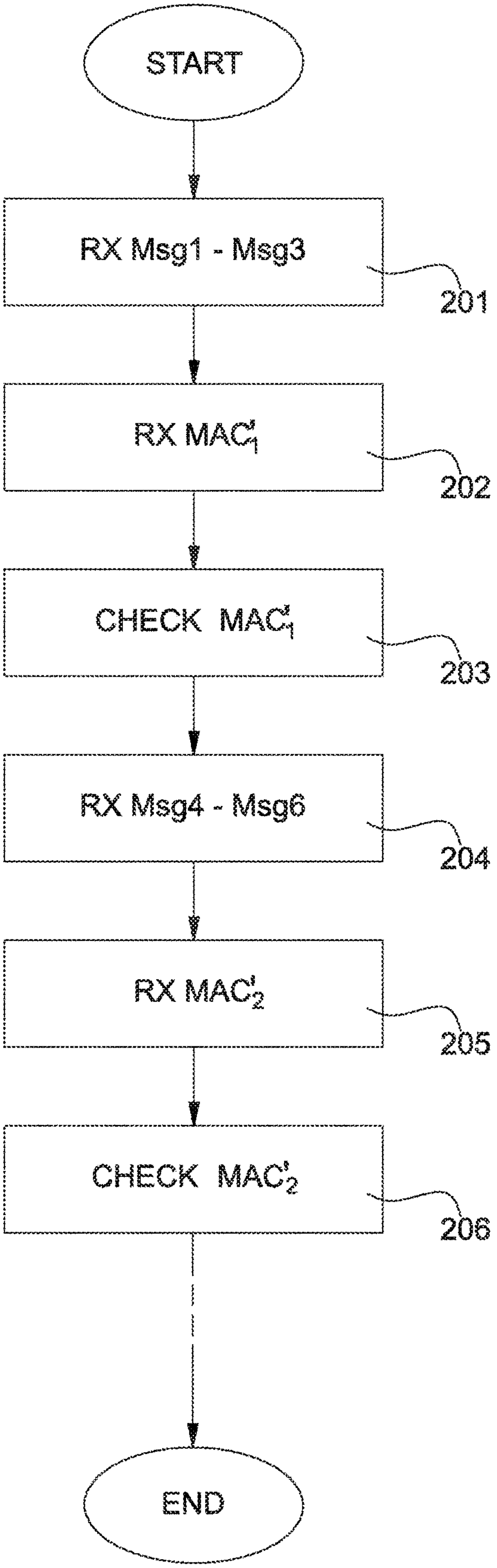
FIG. 5 illustrates, by means of a flowchart, a method implemented by the nodes of the network of FIG. 1 in reception.

FIG. 5 illustrates, by means of a flowchart, a procedure for receiving data on the CAN bus 4 by a receiving node, here illustratively the node $E_N$.

In reception, the receiving node $E_N$ acquires the messages Msg1-Msg3 (step 201) and the authentication frame 20 containing the code $MAC_1$ (step 202). It is noted that, in the reception step, the code $MAC_1$ transported by the authentication frame 20 could be different from the code $MAC_1$ transmitted by the node $E_1$ (due to transmission errors or due to fraudulent activities). Therefore, the received code is referred to here by the reference MACY'.

It is further noted that, in the reception step, the messages Msg1-Msg3 and the code $MAC_1$ could be not perfectly sequential (for example, because the receiving node $E_N$ is receiving a plurality of messages, and related authentication frames, from different sending nodes $E_1$, $E_2$, . . . ). In the event of messages received from a plurality of sending nodes $E_1$, $E_2$, . . . , the reception buffer of the receiving node $E_N$ will contain various messages and related authentication frames 20 with a random sequence or in any case a sequence that is not predeterminable a priori. However, as each message and each authentication frame transport a generic identifier or the identifier of the sending node $E_1$, $E_2$, . . . that generated it (in particular, the source address of the sending node), the receiving node $E_N$ is able to carry out the correct sequencing for the calculation of each respective code $MAC_1$' received.

Then, the receiving node $E_N$ checks (step 203) the authenticity of the received code $MAC_1$' contained in the field 20*a* of the authentication frame 20; in other words, the node $E_N$ checks if the code $MAC_1$' corresponds to the expected code $(MAC)'=MAC_{EXP}$, ideally $MAC_1'=MAC_{EXP}=MAC_1$), i.e. the code $MAC_1$' is a function of the data Data1-Data3 of the messages Msg1-Msg3 (as discussed with reference to the transmission step 102). It is evident that, for this purpose, all nodes $E_1$-$E_N$ of the network 2 share a common encryption mechanism (e.g., algorithm), such that the receiving node is always able to reconstruct, on the basis of the data of the payload field of the received messages, the MAC code calculated by the sending node on the basis of the data of the payload field of the messages to be transmitted.

The receiving node, after calculating the expected MAC code, can carry out a comparison with the MAC code received and detect whether they are identical or not. In the case where they are identical, the related messages are accepted and processed. In cases where they are not identical, countermeasures can be taken, for example, the messages Msg1-Msg3 on the basis of which the incorrect code $MAC_1$' was calculated are rejected and a related error message is transmitted by the node that detected the error. In the case where the receiving node notices that a same node transmits messages which are repeatedly rejected because there is discordance between the received and the expected MAC codes, the receiving node could decide to consider the transmitting node as "potentially compromised" (for example, when the number of messages exceeds a predetermined value), and ignore it for a predefined period of time. After the predefined period of time has passed, the receiving node could decide to resume processing the messages coming from the transmitting node.

Still with reference to FIG. 5, at step 204, the node $E_N$ acquires in sequence the further messages Msg4-Msg6 and (step 205) the authentication frame 20 containing the $MAC_2$ code calculated by the node $E_1$ as a function of the data Data4-Data6 of the messages Msg4-Msg6. Then, step 206, the node $E_N$ checks the authenticity of the code $MAC_2$ in a manner analogous to the foregoing description.

The procedure continues until all the messages sent by the sending node $E_1$ have been received and processed.

In the event that a hacker, or a person with malicious intent, or another person, enters undesired data frames on the CAN bus 4, such person also has to know the methodology for generating the MAC code in order for the entered data frames to be accepted by the nodes $E_1$-$E_N$. In fact, as discussed in the foregoing, the acceptance by each receiving node of the messages addressed thereto is always subject to the verification of the correctness of the MAC code, calculated on the basis of a (confidential) algorithm residing in each node $E_1$-$E_N$. In the absence of such verification and acknowledgement, the receiving node enters a state of alarm, in which suitable countermeasures are taken, as discussed above.

In a preferred non-limiting embodiment of the present invention, the MAC code is calculated using an AES-CMAC encryption algorithm (where AES stands for "Advanced Encryption Standard" and CMAC stands for "Cipher-based Message Authentication Code").

The AES-CMAC algorithm is known per se and calculates a MAC code exploiting, typically, the cryptographic algorithm AES128. The AES-CMAC encryption algorithm requires the use of an encryption key K. According to an aspect of the present invention, the encryption key K is saved in a local memory of each node $E_1$-$E_N$ (i.e., the same key K is shared by each node $E_1$-$E_N$) so that every node $E_1$-$E_N$, on the basis of the received data and of the encryption key K, is able to calculate the related MAC code, in order to perform, at reception, the comparison between the MAC code received and the MAC code expected (steps 203 and 206) of FIG. 5.

According to a different aspect of the present invention, a respective key $K_1$-$K_N$ associated with each sending node $E_1$-$E_N$ is provided; consequently, the same key $K_1$-$K_N$ can be saved only in the receiving node (or receiving nodes) which is interested in checking the authenticity of the messages sent by a specific sending node, or which must receive messages specifically designed for such receiving node.

It is noted that the fact that the AES-CMAC algorithm generates a MAC code having the same length (in bytes) as the data contained in the payload field 10*b* of the data frames, or a code of greater length, is irrelevant. In fact, in the case where the code generated by the encryption algorithm is represented on a number of bytes that is too large to be entered in the payload of the data frame, operations for the truncation of such MAC code can be carried out in order to respect the requirements regarding the maximum length of data transportable by the authentication frame 20, having a format equal to the format of the data frame 10.

This means that if, for example, the data Data1-Data3 transported in the payload field 10*b* of the messages Msg1-Msg3 are represented on 8 bytes, also the code $MAC_1$ calculated by the AES-CMAC algorithm on the basis of Data1-Data3 can be represented on 8 bytes. The requirement of having a MAC authentication code that can be transported in an authentication frame 20 completely analogous, from the point of view of the format, to the data frame 10 defined by the CAN standard is thus respected.

In this regard, it is noted that the AES-CMAC standard requires 8 bytes (or a multiple of 8 bytes) for security reasons. If the payload of the sent messages has a size less than 8 bytes, a "padding" operation (i.e. zeros are added) is provided so as to guarantee the completion of the minimum 8 bytes required.

In general, for a generic network, the MAC code can have any number of bytes.

According to a further aspect of the present invention, in order to improve the robustness of the proposed method and thus increase the security of the network 2, it is also possible to calculate the MAC code as a function of a further parameter, in addition to the data of the payload field 10*b* of the considered messages.

Specifically, according to an embodiment, an incremental monotonic counter is implemented, represented on a number of bytes equal to the number of bytes transportable by the payload field 10*b*, so that it can constitute as well a valid input for the AES-CMAC encryption algorithm. For example, if the payload field 10*b* is able to transport 8 bytes, the monotonic counter is implemented on 8 bytes. It is noted that 8 bytes are sufficient for covering the entire operational lifetime of the vehicle 1 on which the monotonic counter is implemented. For example, by increasing the monotonic counter by 1 unit every second, the maximum value representable on 8 bytes is reached after $2^{64}$ seconds, corresponding to more than $584 \cdot 10^9$ years.

As mentioned in the foregoing, for a generic network, the monotonic counter can be represented on any number of bytes (not necessarily 8 bytes).

Figure 6A:
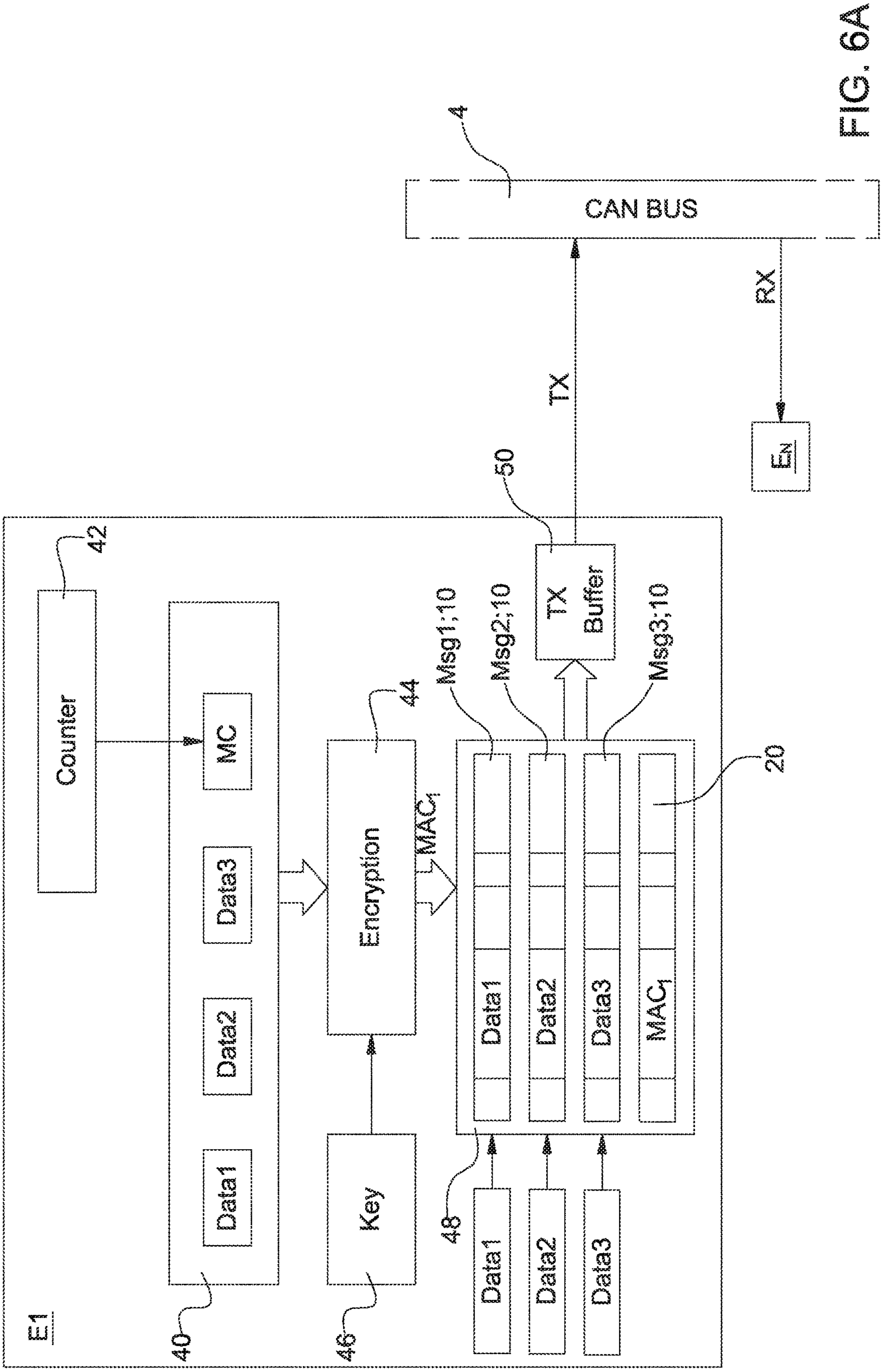
FIGS. 6A and 6B illustrate, by means of function blocks, operations carried out by the nodes of the network of FIG. 1 during the transmission and reception steps, respectively.

FIG. 6A graphically illustrates the foregoing description, by means of function blocks, in relation to the operations performed by the sending node $E_1$.

Figure 6B:
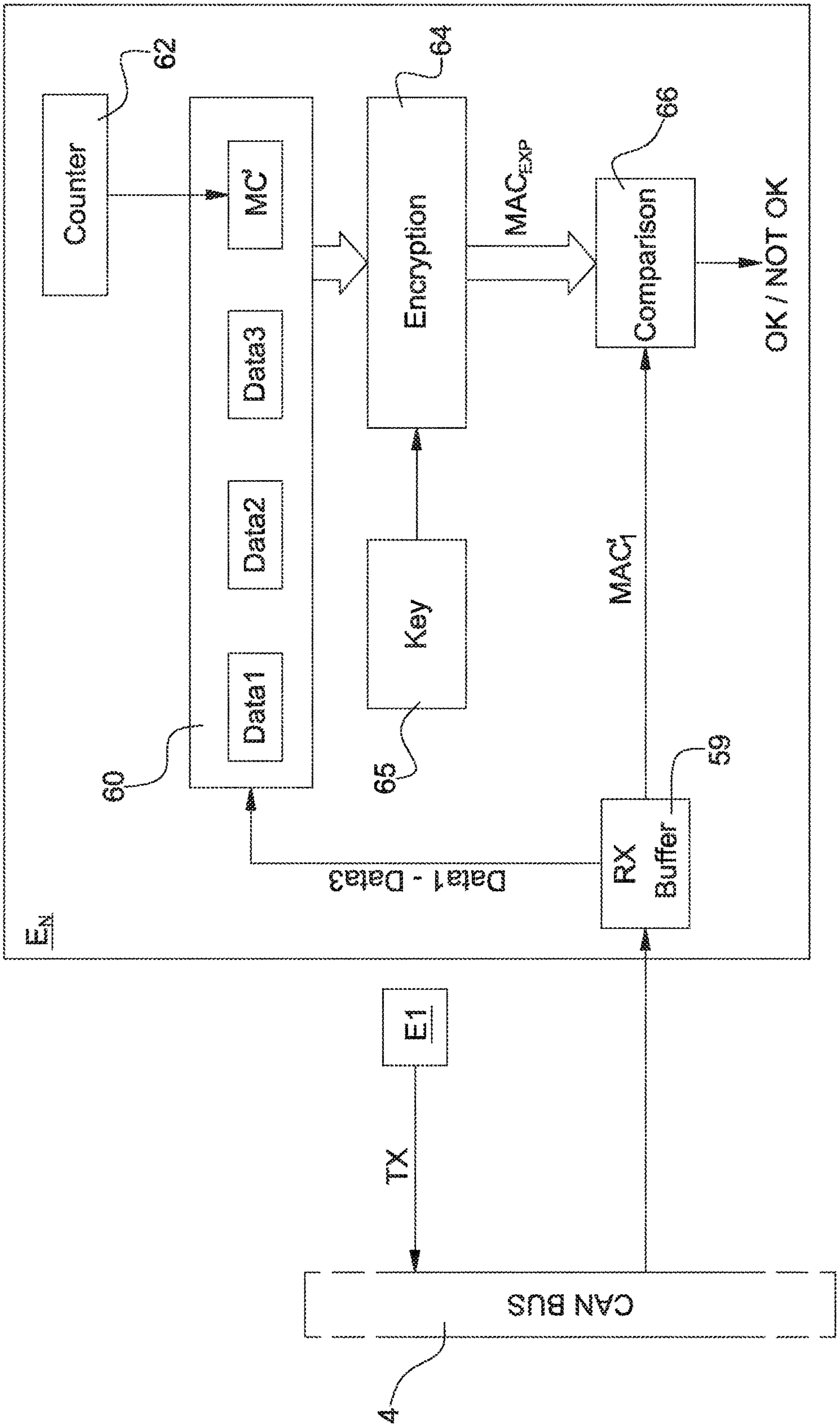

FIG. 6B graphically illustrates the foregoing description, by means of function blocks, in relation to the operations performed by the receiving node $E_N$.

With reference to FIG. 6A, the illustrated operations are carried out by the sending node $E_1$, which has its own controller, or processor, and a local memory, suitably configured to implement the CAN protocol and the described encryption operations. The block 40 in FIG. 6A represents the input of the AES-CMAC encryption algorithm, and includes a data content Data1-Data3 (payload field 10*b*) of three messages Msg1-Msg3 transmitted consecutively by the node $E_1$, plus a current value MC of the monotonic counter (block 42 in FIG. 6A) residing in the node $E_1$.

The data Data1-Data3 and the value MC (as mentioned, all represented on 8 bytes in this example) are input into an encryption block 44, which implements the AES-CMAC encryption algorithm discussed above, together with the encryption key K saved in a local memory (block 46).

The encryption block 44 generates the MAC code (in this example, $MAC_1$, also on 8 bytes—if necessary, a truncation operation is carried out), and sends it to a block 48 for the generation of the corresponding authentication frame 20. As mentioned, the authentication frame 20 is indistinguishable from a data frame 10, from the point of view of the format, and thus the block 48 that generates the authentication frame 20 is the same that generates the data frames (hence of a type known per se and not further described). The block 48 also receives the data Data1-Data3 to be sent to the receiving node $E_N$ and generates the related messages Msg1-Msg3.

The messages Msg1-Msg3, together with the authentication frame 20 generated on the basis of the data Data1-Data3, are thus entered into a transmission queue (or transmission buffer) 50, to be sent in sequence to the CAN bus 4, with the node $E_N$ as recipient. The messages Msg1-Msg3 are sent first and the related authentication frame 20 containing the code $MAC_1$ is sent afterwards.

Reference is now made to FIG. 6B, which illustrates by means of function blocks the operations carried out by the receiving node $E_N$. The latter receives the messages Msg1-Msg3 and the authentication frame 20 containing the code $MAC_1$ (or, rather, the received code $MAC_1'$ according to the foregoing discussion), and enters them into a receiving buffer 59.

The node $E_N$ then calculates locally an expected MAC code ($MAC_{EXP}$) by replicating the same operations carried out at the sending node $E_1$, described above with reference to blocks 40-44 of FIG. 6A. Specifically, the receiving node $E_N$ acquires (block 60) the data Data1-Data3 contained in the payload field 10*b* of the messages Msg1-Msg3 and the current value MC' of a local monotonic counter 62, and sends them to an encryption block 64, which implements the same encryption algorithm (here, AES-CMAC) as the encryption block 44.

The encryption block 64 further receives as an input the encryption key K (saved locally, block 65), and generates as an output a number on 8 bytes (with possible truncation, analogously to what carried out by the block 44) which is compared (block 66) with the code $MAC_1'$ received. The comparison is intended to evaluate the identicalness between the MAC code expected ($MAC_{EXP}$) and the MAC code received ($MAC_1'$). The result of the comparison (OK=valid/NOT OK=invalid) determines the subsequent actions to be taken.

The above description also applies, analogously, to the subsequent transmissions/receptions, for example for the transmission/reception of the three further messages Msg4-Msg6, with the related authentication frame 20 which transports the related $MAC_2$ code.

The use of a monotonic counter has the function of guaranteeing the "freshness" of the data received and not only the integrity of the encryption. In fact, it could happen that a hacker, or a person with malicious intent, acquires a plurality of data frames, with related authentication frames 20, and re-enters on the CAN bus 4 such data frames and related authentication frames 20 (formally correct) at a later moment in the life of the vehicle 1, causing unpredictable errors. However, the presence of the monotonic counter would hinder such possibility as the MAC code would always depend on the current value of the counter which, as mentioned, is incremental and varies during the operational lifetime of the vehicle 1.

The procedure described above applies to the transmission and reception operations by any node of the network 2 and, in general, it is noted that each node $E_1$-$E_N$ of the network 2 is equipped with its own controller, or processor, and a local memory, suitably configured to implement the CAN protocol and the encryption/decryption operations described with reference to the transmission and reception (FIGS. 6A, 6B).

Moreover, each node $E_1$-$E_N$ is equipped with its own incremental monotonic counter of the type described in the foregoing.

In order to guarantee that each receiving node recognizes the authentication frame 20 (and does not confuse it with a generic data frame 10), it is possible to preliminarily define some recognition strategies.

For example, it is possible to enter into the header field 10*a* of the authentication frame 20 an indication in such sense, relating both to the identification of such frame and to the number of preceding messages on the basis of which the corresponding MAC code was calculated.

A different embodiment provides that all of the nodes $E_1$-$E_N$ share the same strategy to be adopted for the recognition of the authentication frame 20, i.e. the fact that such authentication frame 20 is always generated (and thus always received) after a predefined number of messages (data frames). In the examples discussed in the foregoing, such number was equal to three (the groups Msg1-Msg3 and Msg4-Msg6). However, it is evident that it is possible to define any number (equal to or greater than two) of data frames after which an authentication frame 20, in which the transported MAC code is calculated on the basis of the data of the predefined number of preceding data frames, is sent (and consequently received). It is evident that, in this context and in the case where the communication between the nodes $E_1$ and $E_N$ is completed with a single message, it would be possible to provide the sending of further data frames (until the predefined number of frames necessary for the generation of the authentication frame 20 is reached) having zero information content or predefined information, suitably managed by the receiving node.

The above description is valid in the case where the transmission by the sending node $E_1$ and the processing of the information received by the receiving node $E_N$ starts and ends in a time interval that is less than the variation of the value MC/MC' of the local counters 42, 62. In fact, if the value MC/MC' of the local counter resulted to be different in transmission and reception, the comparison of the block 66 of FIG. 6B would not give a reliable response.

Although the transmission to the CAN bus 4 is generally very rapid (in the order of thousandths of a second), such drawback can be remedied by adopting one or more strategies.

For example, in a possible embodiment, it is possible to configure each local counter of the nodes $E_1$-$E_N$ such that it is increased by a counting unit after a predetermined time interval (e.g. 2-5 seconds), so as to always guarantee the transmission, the reception and the processing of the frames of interest (containing data and related MAC code) within such time interval.

In a further embodiment, the receiving node $E_N$ can acquire and save a plurality of values MC' of the counter 62 during a time interval $T_C$ (e.g. 2-5 seconds) preceding the instant of reception of the authentication frame. The block 64 then calculates a plurality of MAC codes, each as a function of the data received (Data1-Data3) and of a different value MC' supplied by the counter 62 (i.e. both the value that the counter 62 assumes at the instant of reception of the authentication frame and all the values that the counter 62 assumed in the time interval $T_C$).

In a further embodiment, the receiving node $E_N$ can acquire and save a plurality of values MC' of the counter 62 during a time interval which is centred with respect to the instant of reception of the authentication frame 20, or centred with respect to the instant of calculation of the MAC code by the block 64. Such centred time interval includes a time interval $T_C$ (e.g., 2-5 seconds) preceding the instant of reception and/or calculation of the authentication frame and a time interval $T_P$ (e.g., 1-2 seconds) subsequent to the instant of reception/calculation of the authentication frame; such centred time interval also includes the instant of reception and/or calculation of the authentication frame 20. The block 64 then calculates a plurality of MAC codes, each as a function of the data received (Data1-Data3) and of a respective plurality of values MC' supplied by the counter 62 (i.e., both the value that the counter 62 assumes at the instant of reception/calculation of the authentication frame and all the values that the counter 62 assumed in the time interval $T_C$ and in the time interval $T_P$).

Such MAC codes are then supplied to the comparison block 66, which acquires them. The comparison has a positive outcome (OK) in the event that the MAC code received with the authentication frame 20 (MAC)' in FIG. 6B) is equal to at least one of the plurality of MAC codes calculated by the encryption block 64.

In order to obviate a possible drift of the local monotonic counters of the nodes $E_1$-$E_N$, which could become desynchronized with respect to one another, the present invention provides two possible variants, which are discussed in the following.

In a first variant, one of the nodes $E_1$-$E_N$ assumes the role of master node, and the remaining nodes assume the role of slave nodes.

In this case, the master node sends to the CAN bus 4, at random or predetermined instants of time, an updated value $MC_{new}$ of its own monotonic counter. Such updated value $MC_{new}$ can be the current value of the counter, or a value calculated as a function of the value of its own local clock $MC_{INT\_CLOCK}$ (e.g., the clock of the controller or processor of the master node) to which a positive offset "OFFSET", of a predetermined or random value, e.g., equal to a few seconds, in particular between 10 s and 20 s, is added: $MC_{new}=MC_{INT\_CLOCK}+OFFSET$.

The slave nodes receive the value $MC_{new}$ and update the value of their own local counters to the new value $MC_{new}$. For greater security, in a non-limiting embodiment, the updating is carried out by each slave node if and only if the value received $MC_{new}$ is greater than the current value of its own local counter. Should the value $MC_{new}$ not be received correctly by the slave nodes, there is a desynchronization between the various nodes of the network (the MAC codes generated by all the nodes are erroneous); the master node is able to detect this undesired situation by performing a cross-check with the preceding MC values (i.e. the master node can be configured to recognize that a node of the network is using an old MC value, different from the updated value).

In order to restore the correct values of the counters, the master node re-sends, in this situation, the updated value $MC_{new}$. It is further noted that, in the event that a slave node is disconnected from the CAN network during the updating of the value of the counter, or for whatever reason loses the synchronism, the master node is able to detect such situation, and restores the correct functioning by re-sending the new value $MC_{new}$.

In a second variant, there is a "peer-to-peer" configuration between the nodes $E_1$-$E_N$.

In this case, all the nodes $E_1$-$E_N$ send (periodically or at random instants) a new value $MC_{new}$ of the monotonic counter that is greater than the current value, analogously to the foregoing: $MC_{new}=MC_{INT\_CLOCK}$+OFFSET. The other nodes $E_1$-$E_N$ receive the new value $MC_{new}$ and update their respective counter if and only if the received new value $MC_{new}$ is greater than the current value of their own internal counter. In the case of a peer-to-peer configuration, if the value $MC_{new}$ results not correctly received by all the nodes of the network (e.g. some nodes are using an old MC value), then the node using a not updated MC value re-sends a new value $MC_{new}$. Moreover, in the event that a node is disconnected from the CAN network during the updating of the value of the counter, or for whatever reason loses the synchronism, the value $MC_{new}$ is sent immediately by the node that is not able to correctly calculate the MAC code.

It is noted that, in both the aforementioned variants, the OFFSET value is generated in such a manner that it is greater than the maximum propagation delay that there can be on the CAN bus 4, also taking into account potential processing delays in the transmission and reception step. It is also advantageous to take into account the time drift of the clocks.

It is further noted that, the value $MC_{new}$ of the counter being represented on 8 bytes, such value can be transmitted using the predefined data frames according to the CAN protocol. Analogously, this also applies to the case where a different protocol is used, representing the value MC of the counter on a suitable number of bytes according to the specifications of the protocol used.

The sending of the value $MC_{new}$ can take place by using a dedicated message (for example, having the same structure as the data frame, in a manner similar to the foregoing description regarding the MAC code); in the MAC calculation in the reception step, the value $MC_{new}$ is directly used.

In one embodiment, the frame containing the code $MC_{new}$ is configured with a higher priority compared to the normal data frames.

Figure 7A:
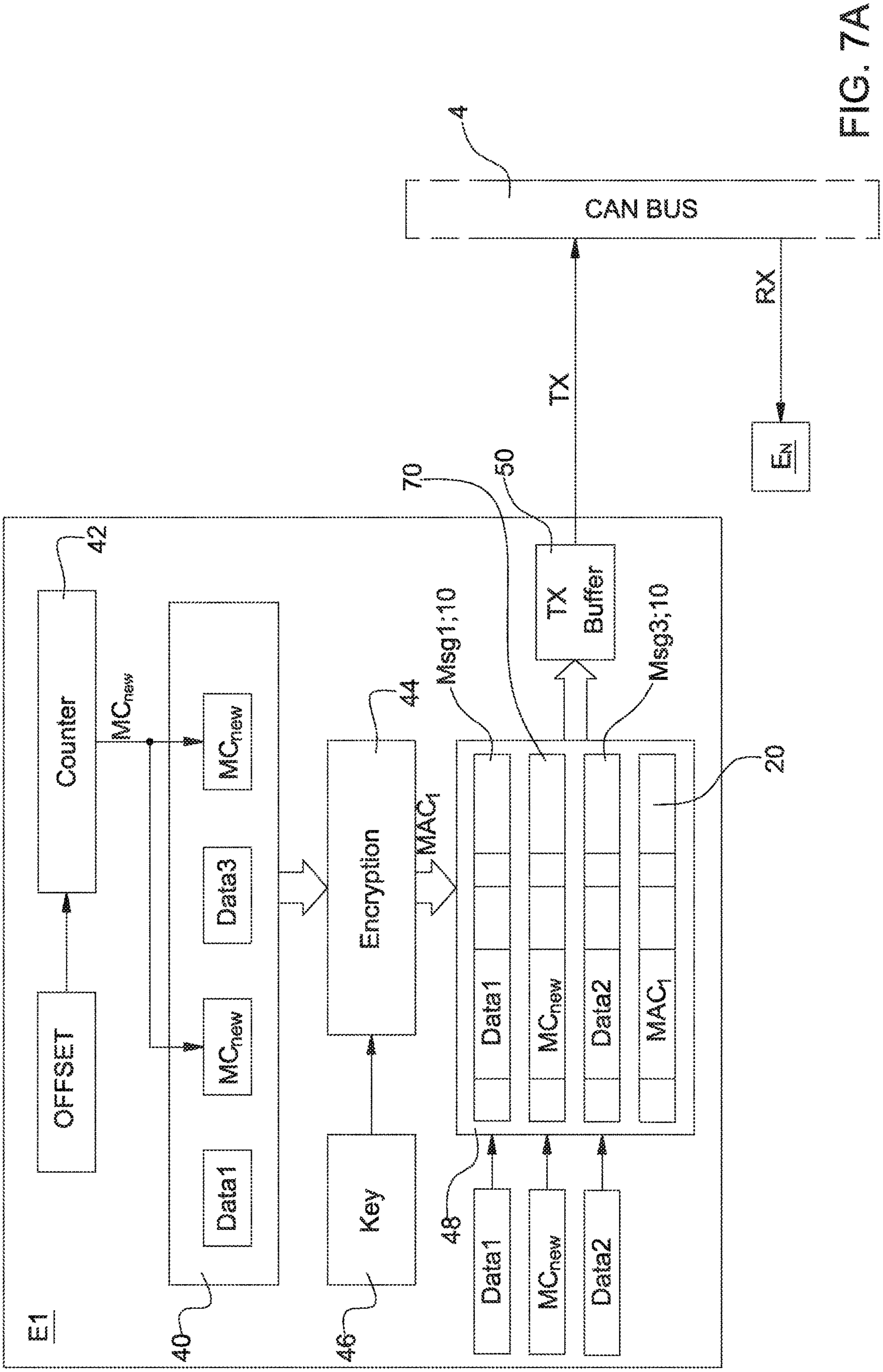
FIGS. 7A and 7B illustrate, by means of function blocks, operations carried out by the nodes of the network of FIG. 1 during the synchronization steps of a local monotonic counter.

FIG. 7A (in which common elements with those of FIG. 6A are identified by the same reference numerals) graphically illustrates the generation and sending steps of the value $MC_{new}$ by means of a dedicated message 70 analogous to a data frame.

The counter 42 is updated with an OFFSET value (as described in the foregoing), in order to generate the updated value $MC_{new}$. The block 40 in FIG. 7A represents the input of the AES-CMAC encryption algorithm, and includes a data content Data1 and Data3 (payload field 10*b*) of two messages Msg1 and Msg3 transmitted by the node $E_1$, plus the updated value $MC_{new}$ of the monotonic counter (block 42), in analogy to the foregoing description with reference to FIG. 6A. In the case of FIG. 7A, the sharing of the updated value $MC_{new}$ of the monotonic counter 42 occurs by replacing the data message Msg2 (which was present in the example of FIG. 6A) with an equivalent message which transports the updated value $MC_{new}$ of the monotonic counter 42 that one wishes to share with the other nodes of the network (according to the Master-Slave or Peer-to-Peer strategies described in the foregoing). In other words, the value $MC_{new}$ is treated and transmitted as if it were an information datum, just like the datum Data2 of FIG. 6A.

Figure 7B:
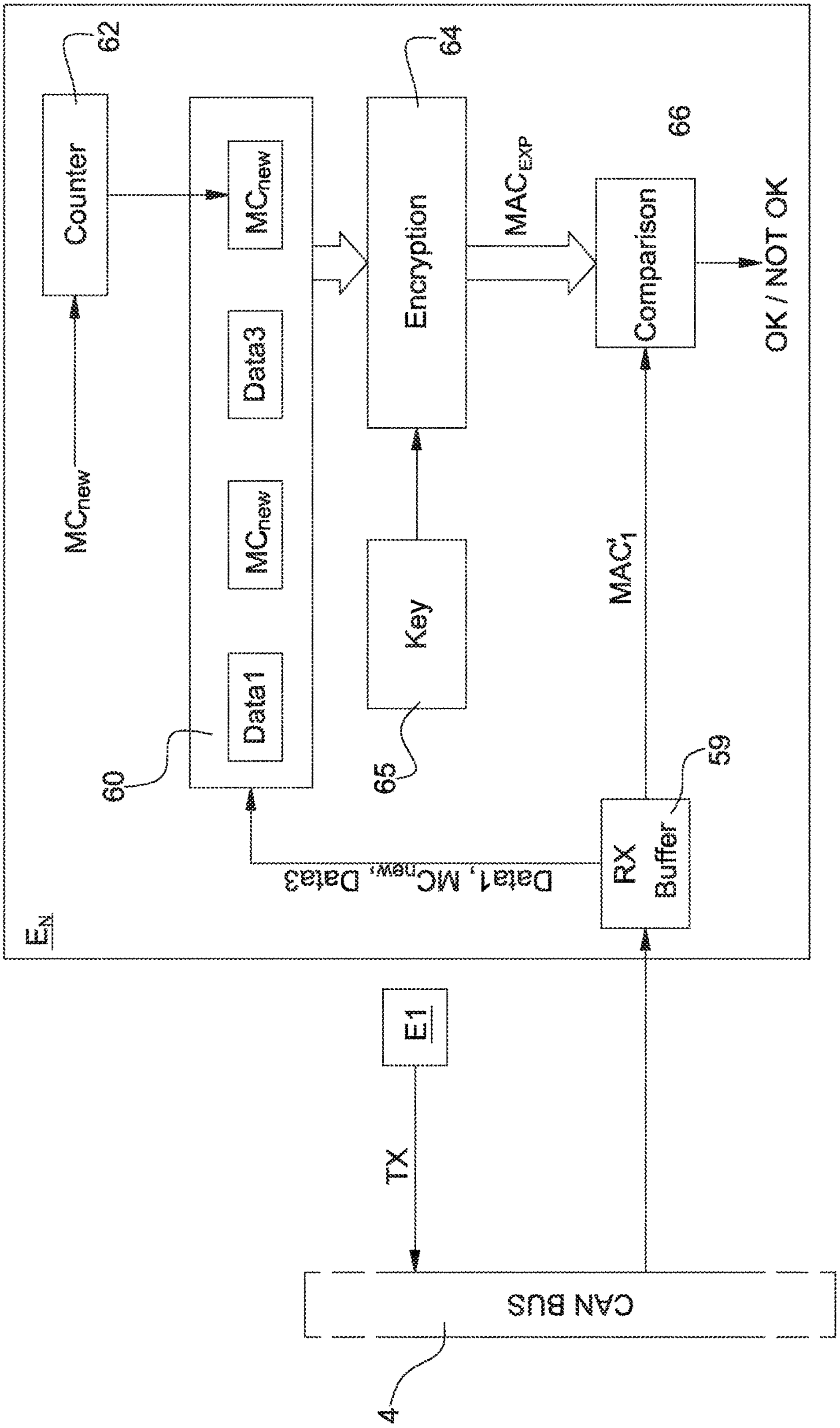

In the reception step, FIG. 7B (in which common elements with FIG. 6B are identified by the same reference numerals), the updated value $MC_{new}$ is supplied to the local counter 62, which in turn supplies it to the block 60, which uses it for the calculation of the MAC code. It is evident that, in an alternative embodiment, the updated value $MC_{new}$ can be supplied directly to the block 60, bypassing the local counter 62.

The blocks 60-66 operate analogously to the foregoing description with reference to FIG. 6B, using the value $MC_{new}$ instead of the Data2, and the same value $MC_{new}$ instead of the value MC'.

If the comparison performed by the block 66 gives a positive response ("OK"), then the updating of the local counter 62 to the new value $MC_{new}$ is confirmed; otherwise, strategies for re-synchronizing the receiving node $E_N$ are implemented.

Based on what described and illustrated above, the advantages that the described system allows obtaining are evident.

Figure 8:
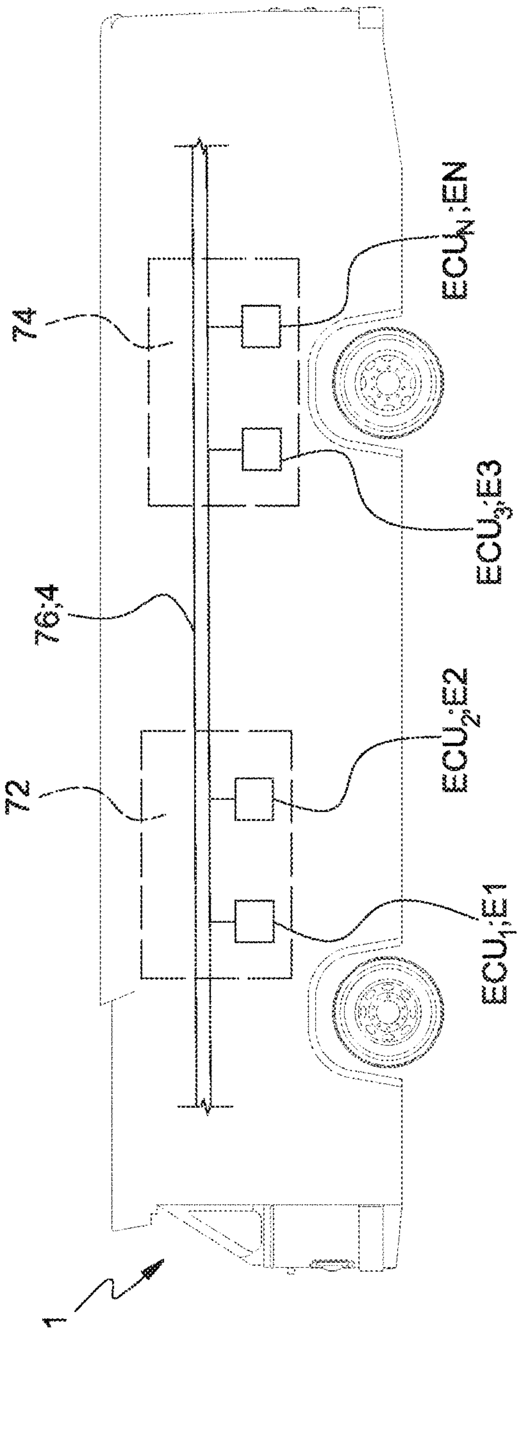
FIG. 8 schematically illustrates a vehicle comprising the network of FIG. 1.

With reference to FIG. 8, a vehicle 1 is shown which includes an on-board electronics system 72 used for controlling on-board systems 74 of the vehicle 1. The vehicle 1 is represented only schematically and can be a car, a motorcycle, a truck, a sports car, an SUV, a recreational vehicle, a boat, an aircraft, etc. The on-board electronics system 72 and the on-board systems 74 include an illustrative arrangement of electronic control units ($ECU_1$, $ECU_2$, . . . , $ECU_N$—corresponding to the nodes $E_1$, $E_2$, . . . , $E_N$ discussed in the foregoing) connected in a manner to be in mutual communication by means of a communication bus 76, for example the CAN bus 4 described in the foregoing.

The on-board electronics system 72 can include a plurality of ECUs in the form of electronic hardware components distributed throughout the vehicle 1, for example configured to receive inputs from one or more sensors in order to carry out diagnostic, monitoring, control and reporting operations and/or other functions. At least two, or all, ECUs are connected to one another by means of the bus 76; each ECU can be programmed to control the on-board systems 72 of the vehicle 1. Each ECU, shown as part of the on-board electronics system 72 or of the on-board systems 74, generally comprises a microprocessor, a non-volatile memory device which saves instructions that are readable by the microprocessor, input/output ports (I/O) for transmitting and receiving data and other control information on the bus 76. These components can be varied based on the particular systems of the vehicle 1 that the respective ECU controls, and on the type of bus 76 used. The processing sophistication and power of the microprocessor, the number of I/Os and the complexity of the instructions or of the software readable by the microprocessor can be increased or decreased based on the type and function of the vehicle 1. The microprocessor can be any type of device capable of processing electronic instructions, including microcontrollers, host processors, controllers, communication processors for vehicles and application-specific integrated circuits (ASIC). The microprocessor carries out different types of instructions saved digitally, such as software or firmware programmes saved in the memory device. For example, the microprocessor can run programmes or process data in order to carry out at least a part of the method discussed in the foregoing with reference to FIGS. 3, 5, 6A, 6B. The memory device can be implemented using known types of random-access memory (RAM) or EEPROM memory, while the I/O can be implemented using a controller, such as a CAN controller, or some other means depending on the type of bus 76 used. In such sense, the ECUs can include hardware compatible with a particular type of bus 76 used on the vehicle 1. For example, the ECUs that communicate using a CAN bus can include a microprocessor, a CAN controller and an I/O unit in the form of a transceiver which sends and receives messages on the CAN bus.

In particular, the present invention proposes a communication method and system between nodes of a network (in particular between ECUs of a vehicle) which are secure and implementable without altering the current architectural configuration of the network and of the vehicle, and without requiring the use of new communication technologies not forming part of the protocol standard based on which the network operates. Consequently, also the implementation costs are particularly reasonable.

Finally, it is clear that modifications and variations can be carried out to what described and illustrated herein without thereby departing from the protection scope of the present invention, as defined in the appended claims.

In particular, the present invention can be applied to transmission networks of a type different from the CAN bus, for example to networks based on the CAN-FD protocol, networks based on the TCP/IP protocol, Local Interconnect Network (LIN), Media Oriented Serial Transport (MOST), Ethernet, Local Area Network (LAN), and even others.

In particular, the present invention can be applied to wired or wireless transmission networks.

Moreover, although the AES-CMAC encryption method has been mentioned explicitly, it is possible to use different encryption methods and algorithms such as, for example, the algorithms HMAC ("Keyed-Hash Message Authentication Code"), KMAC ("KECCAK Message Authentication Code"), GMAC ("Galois Message Authentication Code"), or even others such as, for example, DAA, CBC-MAC, NMAC, OMAC/CMAC, PMAC, VMAC, UMAC, Polyl305, SipHash, and even others.

Furthermore, it is evident that the encryption algorithms that can be used for the generation of the MAC code can be of various types; for example, it is possible to use symmetrical encryption algorithms (in which the encryption key K is saved in all of the nodes $E_1$-$E_N$) or asymmetrical encryption algorithms (public keys are saved in all of the nodes $E_1$-$E_N$, while a private key is available in a single node).

Alternatively, it is possible to provide a private key $K_1$, $K_2$, . . . , $K_N$ different in each node, and related public keys $P_1$, $P_2$, . . . , $P_N$ in all of the nodes, as illustrated below:

Node $E_1$: ($K_1$, $P_2$, . . . , $P_N$),

Node $E_2$: ($K_2$, $P_1$, $P_3$, . . . , $P_N$),

. . . ,

Node $E_N$: ($K_N$, $P_1$, $P_2$, . . . , $P_{N-1}$).

The invention claimed is:

1. A method for data exchange on a communication network (2) operating according to a transmission/reception protocol, the communication network including a transmission bus (4), and a first node ($E_1$) and a second node ($E_N$) connected to the transmission bus (4), the method comprising the steps, carried out by the first node ($E_1$), of:

constructing a first and a second data frame (10) each having a frame format that is defined by said protocol and including a respective payload field (10*b*), said payload fields (10*b*) containing respective first and second information data (Data1, Data2) to be transmitted to the second node ($E_N$);

calculating a first message authentication code ($MAC_1$) as a function of the first and the second information data (Data1, Data2) to be transmitted;

constructing a third data frame (20), having a frame format that is defined by said protocol and includes a payload field (20*a*), and containing, in the payload field (20*a*), said first message authentication code ($MAC_1$);

transmitting to the transmission bus (4) the first, the second and the third data frames;

the method further comprising the steps, carried out by the second node ($E_N$), of:

receiving from the transmission bus (4) the first, the second and the third data frames (10, 20);

extracting the first information data (Data1) from the first data frame (10) received, the second information data (Data2) from the second data frame (10) received and the first message authentication code ($MAC_1$; $MAC_1$') from the third data frame (20) received;

calculating a second message authentication code ($MAC_{EXP}$) as a function of the first and the second information data (Data1, Data2) extracted;

comparing the first message authentication code ($MAC_1$; $MAC_1$') extracted with the second message authentication code ($MAC_{EXP}$) calculated; and accepting the first and the second data frames (10) only if the first message authentication code ($MAC_1$; $MAC_1$') extracted is identical to the second message authentication code ($MAC_{EXP}$) calculated, wherein the step of calculating the first message authentication code ($MAC_1$) further comprises, by the first node, calculating the first message authentication code ($MAC_1$) as a function of a respective first count value (MC, $MC_{new}$), and the step of calculating the second message authentication code ($MAC_{EXP}$) further comprises, by the second node, calculating the second message authentication code ($MAC_{EXP}$) as a function of a respective second count value (MC', $MC_{new}$), the method further comprising synchronizing the first count value and the second count value by:

setting one from among the first node ($E_1$) and the second node ($E_2$) as a master node and the other from among the first node and the second node as a slave node;

providing, by the master node, an updated count value ($MC_{new}$) of the respective count value;

sending, by the master node, the updated count value to the transmission bus;

receiving, by the slave node, the updated count value; and updating, by the slave node, the respective count value as a function of the updated count value.

2. The method according to claim 1, wherein the updated count value is a random value.

3. The method according to claim 1, wherein the updated count value is provided by a counter of the master node.

4. The method according to claim 3, wherein the counter is a monotonic counter.

5. The method according to claim 1, wherein the updated count value is a current value of a counter of the master node.

6. The method according to claim 1, wherein the updated count value is a value calculated as a function of a value ($MC_{INT\_CLOCK}$) of a local clock of the master node and a random offset (OFFSET).

7. The method according to claim 6, wherein the random offset is a positive random offset, wherein calculating the updated count value comprises adding the positive random offset to the value of the local clock.

8. The method according to claim 1, wherein said first message authentication code ($MAC_1$; $MAC_1$') is identical to the second message authentication code ($MAC_{EXP}$) only if the first and the second information data to be transmitted are identical to the first and the second information data extracted, and if the first count value (MC, $MC_{new}$) is identical to the second count value (MC', $MC_{new}$).

9. The method according to claim 1, wherein the step of calculating the first message authentication code ($MAC_1$) further comprises calculating the first message authentication code ($MAC_1$) as a function of an encryption key (K), and the step of calculating the second message authentication code ($MAC_{EXP}$) further comprises calculating the second message authentication code ($MAC_{EXP}$) as a function of a decryption key (K), wherein said encryption key corresponds to the decryption key, thus implementing a symmetric encryption algorithm, alternatively, the encryption key is a private key and the decryption key is a public key different from the encryption key, thus implementing an asymmetric encryption algorithm.

10. The method according to claim 1, wherein the step of calculating the second message authentication code ($MAC_{EXP}$) is further carried out for one or more further count values (MC') supplied to the second node ($E_N$) during a time frame prior to the instant of receiving said second value (MC'), the method further comprising the steps of:

calculating, at the second node ($E_N$), respective one or more further message authentication codes as a function of said one or more further count values (MC');

comparing, at the second node ($E_N$), the first message authentication code ($MAC_1$; $MAC_1$') extracted with each of said one or more further message authentication codes; and accepting, by the second node ($E_N$), the first and the second data frames (10) only if the first message authentication code ($MAC_1$; $MAC_1$') extracted is identical to at least one from among said one or more further message authentication codes.

11. The method according to claim 1, wherein the step of calculating the first message authentication code ($MAC_1$) comprises carrying out an AES-CMAC cryptographic algorithm.

12. The method according to claim 1, wherein said protocol is a CAN protocol that defines a data type frame format, wherein the first, the second and the third data frames all have the same frame format of the type defined by said protocol.

13. The method according to claim 1, wherein said transmission bus (4) is a CAN bus of a vehicle (1), said first node ($E_1$) is a first ECU of the vehicle (1) and said second node ($E_N$) is a second ECU of the vehicle (1).

14. The method according to claim 1, wherein said payload fields (10*b*, 20*a*) of the first, the second and the third data frames (10, 20) are configured to transport a number of bytes defined by said protocol, said first and second message authentication codes ($MAC_1$, $MAC_{EXP}$) being represented on a number of bytes equal to said number of bytes defined by said protocol.

15. The method according to claim 1, wherein the first and the second count values (MC, MC') are represented on a number of bytes equal to said number of bytes defined by said protocol.

16. A data exchange system operating according to a transmission/reception protocol, including a communication network (2) including a transmission bus (4), a first node ($E_1$) connected to the transmission bus (4) and a second node ($E_N$) connected to the transmission bus (4), said first node ($E_1$) being configured to:

construct a first and a second data frame (10) each having a frame format that is defined by said protocol and includes a respective payload field (10*b*), said payload fields (10*b*) containing respective first and second information data (Data1, Data2) to be transmitted to the second node ($E_N$);

calculate a first message authentication code ($MAC_1$) as a function of the first and the second information data (Data1, Data2) to be transmitted;

construct a third data frame (20), having a frame format that is defined by said protocol and includes a payload field (20*a*), and containing, in the payload field (20*a*), said first message authentication code ($MAC_1$); and transmit, to the transmission bus (4), the first, the second and the third data frames; said second node ($E_N$) being configured to:

receive, from the transmission bus (4), the first, the second and the third data frames (10, 20);

extract the first information data (Data1) from the first data frame (10) received, the second information data (Data2) from the second data frame (10) received and the first message authentication code ($MAC_1$; $MAC_1$') from the third data frame (20) received;

calculate a second message authentication code ($MAC_{EXP}$) as a function of the first and the second information data (Data1, Data2) extracted;

compare the first message authentication code ($MAC_1$; MAC') extracted with the second message authentication code ($MAC_{EXP}$); and accept the first and the second data frames (10) only if the first message authentication code ($MAC_1$; $MAC_1$') extracted is identical to the second message authentication code ($MAC_{EXP}$), wherein the first node is configured to calculate the first message authentication code ($MAC_1$) as a function of a respective first count value (MC, $MC_{new}$), wherein the second node is configured to calculate the second message authentication code ($MAC_{EXP}$) as a function of a respective second count value (MC', $MC_{new}$), wherein, in order to synchronise the first and the second count values with one another, one from among the first node ($E_1$) and the second node ($E_2$) is configured to be a master node and the other from among the first node and the second node is configured to be as a slave node, the master node being configured to:

provide an updated count value ($MC_{new}$) of the respective count value; and send the updated count value to the transmission bus, the slave node being configured to:

receive the updated count value; and update the respective count value as a function of the updated count value.

17. The system according to claim 16, wherein the master node has a counter configured to provide the updated count value.

18. The system according to claim 16, wherein the counter of the master node is configured to provide a random value as the updated count value.

19. The system according to claim 16, wherein said second node ($E_N$) is further configured to validate an identity between the first message authentication code ($MAC_1$; $MAC_1$') extracted and the second message authentication code ($MAC_{EXP}$) only if the first and the second information data to be transmitted are identical to the first and the second information data extracted, and if the first count value (MC) is identical to the second count value (MC').

20. The system according claim 16, wherein said second node ($E_N$) is further configured to:

repeat the operation of calculating the second message authentication code ($MAC_{EXP}$) for one or more further count values (MC') supplied from the second incremental monotonic counter (62) during a time frame prior and/or subsequent to the instant of receiving said second value (MC');

calculate respective one or more further message authentication codes as a function of said one or more further count values (MC');

compare the first message authentication code ($MAC_1$; $MAC_1$') extracted with each of said one or more further message authentication codes; and accept the first and the second data frames (10) only if the first message authentication code ($MAC_1$; $MAC_1$') extracted is identical to at least one from among said one or more further message authentication codes.

21. The system according to claim 16, wherein the first node ($E_1$) is further configured to calculate the first message authentication code ($MAC_1$) by carrying out an AES-CMAC cryptographic algorithm.

22. The system according to claim 16, wherein said protocol is a CAN protocol that defines a data type frame format, wherein the first, the second and the third data frames all have the same frame format of the type defined by said protocol.

23. The system according to claim 16, wherein said transmission bus (4) is a CAN bus of a vehicle (1), said first node ($E_1$) is a first engine control unit, ECU, of the vehicle (1) and said second node ($E_N$) is a second engine control unit, ECU, of the vehicle (1).

24. The system according to claim 16, wherein said payload fields (10*b*, 20*a*) of the first, the second and the third data frames (10, 20) are configured to transport a number of bytes defined by said protocol, said first and second message authentication codes ($MAC_1$, $MAC_{EXP}$) being represented on a number of bytes equal to said number of bytes defined by said protocol.

25. The system according to claim 16, wherein the first and the second count values (MC, MC') are represented on a number of bytes equal to said number of bytes defined by said protocol.

26. A vehicle (1), including a system for data exchange according to claim 16.

* * * * *